United States Patent [19]

Doeringer et al.

[11] Patent Number: 5,787,430
[45] Date of Patent: Jul. 28, 1998

[54] VARIABLE LENGTH DATA SEQUENCE BACKTRACKING A TRIE STRUCTURE

[75] Inventors: Willibald Doeringer, Fussgoenheim, Germany; Douglas Dykeman, Richterswil, Switzerland; Günter Karjoth, Waedenswil, Switzerland; Mehdi Nassehi, Horgen, Switzerland; Mohan Sharma, Mountain View, Calif.

[73] Assignee: International Business Machines Corporation, Armonk, N.Y.

[21] Appl. No.: 765,764

[22] PCT Filed: Jun. 30, 1994

[86] PCT No.: PCT/EP94/02135

§ 371 Date: Dec. 17, 1996

§ 102(e) Date: Dec. 17, 1996

[87] PCT Pub. No.: WO96/00945

PCT Pub. Date: Jan. 11, 1996

[51] Int. Cl.$^6$ .................................................. G06F 17/30
[52] U.S. Cl. .................................... 707/100; 707/3
[58] Field of Search ........................ 707/7, 6, 2, 100, 707/3

[56] References Cited

U.S. PATENT DOCUMENTS

| | | | |
|---|---|---|---|
| 5,153,591 | 10/1992 | Clark | 341/3 |
| 5,519,858 | 5/1996 | Walton et al. | 707/100 |
| 5,640,551 | 6/1997 | Chu et al. | 707/3 |
| 5,655,129 | 8/1997 | Ito | 707/100 |

FOREIGN PATENT DOCUMENTS 0 408 188 A2  6/1990  Germany .................... 707/3

OTHER PUBLICATIONS

Robert L. Kruse, Data Structures & Program Design 379–384 (Prentice–Hall, Inc.) (New Jersey), 1984.

*Primary Examiner*—Paul R. Lintz
*Assistant Examiner*—Thu-Thao Havan
*Attorney, Agent, or Firm*—Douglas W. Cameron

[57] ABSTRACT

The building, maintenance, and use of a database is described having a trie-like structure for storing entries and retrieving an at least partial match, preferably the longest partial match, or all partial matches of a search argument (input key) from said entries, said database having nodes (20), with each node containing first link information (21) leading to at least one previous node (parent pointer) and second link information (25,26) leading to at least one following node (child pointer), at least a stored key (entry, 23, 24), or a combination, thereof. The particular structure of the nodes allows a two-step search process, in which segments of a search argument are firstly used to determine a search path through the trie-like database, said search path being backtracked in the second part of the search. During the second part of the search the entire search argument is compared to entries stored in the nodes until a match is found. The described database allows an efficient use of memories and is advantageously applied to fast data retrieval, in particular related to communication within computer networks. No recursive procedures are applied.

13 Claims, 4 Drawing Sheets

VARIABLE LENGTH DATA SEQUENCE BACKTRACKING A TRIE STRUCTURE

The invention relates to a method and an apparatus for searching the longest matching digital sequence, particularly in routing devices of communication networks. More specifically, the invention concerns the building, maintenance, and use of a dynamic data structure which permits a rapid retrieval of the longest matching sequence stored in this data structure. Even more particularly, the invention describes a compact tree data structure (Patricia trie), including only nodes which either contain at least one stored data sequence (key) or at which the tree branches.

BACKGROUND OF THE INVENTION

A large number of computing or networking tasks require recognizing keywords from a database, such as a lookup table in a computer network or dictionaries in general. After establishing a match between the input keyword and a data sequence from the database, either the information linked to this keyword is retrieved or a program driven by this keyword is executed.

In communication networks, consisting of a number of interconnected users or nodes, data can be sent from one node to any other. Specialized nodes called routers are responsible for delivering or "forwarding" the data to their destination. By analogy, the routers act as post offices. As letters, any of the data sent through a communication network contains information about the destination address, generally as part of a so-called header. Each router compares this information or at least part of it with a list of addresses stored internally. If a match between stored addresses and the destination address is found, the router establishes a path leading to the destination node. Depending on the size of the network and its structure, the data are either directly forwarded to their destination or sent to another (intermediate) router, very much the same way a letter is passed through several post offices until reaching its final address (if ever).

One method for constructing large networks is promulgated by the International Organization for Standardization (ISO). Under this standard, each router does not store routing information for every possible address in the network. Rather, it stores routing information for partial addresses. The ISO standard, then, states that the router should send the packet to the best matching partial address it has in its database. The standard allows to build up a hierarchical structure of nodes using a given number of digits or a given header length: Main routers are addressed by the initial part of the address, subrouters by the middle part, and final destination by the last digits of the address. It is then sufficient for any router to read the digits assigned to the level of hierarchy to which the data are to be sent.

Thus, the ISO routing standard gives an excellent example for the necessity of having partial or prefix matching ability within a data structure for retrieving keywords.

The current invention can equally be applied to link different network communication protocols. As known, a network is at its most basic level a wire or a fiber that connects a number of computers and other equipment. To make use of the physical connection, procedures - or protocols - are necessary to ensure the reliable transfer of data by means of such functions as addressing, setting up and taking down connections, and similar administrative services. These various functions, or services, are typically assigned to individual protocol layers, which together constitute a protocol stack. The number of protocol layers may vary, but conceptually the functions are typically regarded as forming seven layers, a definition introduced by the Open Systems Interconnection (OSI) reference model. Today many different types of protocols exist, for example the ones known under the abbreviations and/or trademarks NET-BIOS for personal computers, TCP/IP for UNIX/INTERNET connections, OSI, or SNA/APPN for host or mainframe communication. The exchange of data from one type of protocol to another requires so-called protocol converters or adapters. As is evident, besides the reformatting of data, it is one of the main features of a protocol converter to translate the syntax, i.e., calls, procedures, functions, commands, and the like from one protocol environment into the syntax of another protocol. Thus, a protocol converter almost inevitable includes lookup tables and requires fast matching procedures.

Other useful applications include assigning an access/security level to a user of shared computer and network equipment, directory look-ups in a telephone context, on-line dictionaries, spelling checkers, and looking up of reference numbers in large organization, such as social security, health or other insurances, banking applications and the like.

The data structure of the invention is a database organized as tree. A tree consists of a number of nodes, each of which possibly branch or point to other nodes. These nodes essentially are arrays of data and must not be confused with the nodes of a network, though the underlying topological similarity between a network and a tree motivated the use of equal terms.

A class of trees is known in which the keyword is stored in the node. A decision whether and to which node to branch implies a comparison between the input keyword and those stored in the node. The result of this comparison determines the choice of the following subtree. Typically, binary search trees belong to this class. The main disadvantage of this class of trees and its corresponding search method is that all bits of the keyword are in the worst case compared k times, k denoting the maximum number of levels within the tree.

In another class of trees, the keywords or data belonging to these keywords are stored in the terminal nodes or leaves of the tree. When a key is searched or inserted, the key itself determines the path to be followed down to a leaf. Trees of this class are called "trie" in the technical field - a term introduced as an allusion to the term "retrieval." If a key, for example, is a sequence of n bits (either 0 or 1), the decision to branch to the left (represented by 0) or to the right (1) at the kth level of the tree is made by using the kth bit of the key sequence, with k being a number between 1 and n. In a data structure belonging to this class, each bit of the key is compared only once.

This data structure is, however, storage consuming: to establish a path to n stored records, on average n/2I n(2) internal nodes, at which the branching decision is made, are necessary. Many of these internal node may have one empty subtree, and, thus, are traversed without a gain of information. Unnecessary internal nodes are eliminated in a compact data structure known as Patricia trie. The Patricia trie is characterized by having a minimum number of internal nodes, or, equally, pointers or key-bit inspections. Each node within a Patricia trie contains information about the bits which characterize the compacted path, e.g., the number of bits to skip before making another bit comparison to decide the direction to branch to. An example of a Patricia trie can be found in: D. E. Knuth, The Art of Computer Programming, Vol. 3: Sorting and Searching, 1973, pp.

490–493. It comprises a header and a number of nodes. A node includes several fields, such as the key field, i.e. a pointer to the stored data, link pointers which refer to other nodes of the trie, direction tags which tell whether these links point to sons or ancestors within the trie, and a skip field which contains information concerning the number of bits of an input word to skip when searching. In this type of trie, the direction tags are used to indicate whether a leaf node has been reached during the search or not: The search process is terminated when the tag in a node has a certain value, e.g. a binary 1.

Data structures lying between the tries and the trees mentioned before have been developed. An example of this type of intermediate data structures is known as Digital Search Trie or DIST. In DIST, keys are stored in the internal nodes, as in the case of binary search trees, but the traversal of the tree during a search or insertion is determined by the bits of the applied search key, as is the case in a trie structure. At each internal node, the search key is compared to the stored key(s), but only one bit is memorized or used for the following branching into a subtree. As described above, at a level k of the tree structure, the kth bit is inspected to determine the next path, left or right, to be followed. The basics of DIST may also be found in the above-mentioned book of D. E. Knuth at pages 481–499.

Another example of a compressed database, suitable for prefix matching, is described in the European patent application EP-A-0 408 188. A search path of reduced length is established by eliminating all nodes which have no influence upon the result of a search. The search argument is fragmented into semi-octets. By comparing a current semi-octet to the ones stored in a node, up to 16 nodes can be addressed as following (child) node. The terminal or leaf nodes of the described database do not contain pointers to other nodes. When the search reaches a leaf node, the search is terminated. Thus, the search method is an elaborated version of the trie structure as described above with semi-octets taking the place of the single bits to identify the path from one node to a following. The described search method is slow, as the search argument is compared to the stored information at every node.

In an article by John A. Dundas III in: Software - Practice and Experience, Vol. 21(10), October 1991, pp. 1027–1040, a DIST concept is extended to a trie with prefix matching ability. The described trie structure includes internal nodes which do not contain a valid keyword (interior nodes) and nodes, in which a valid keyword is stored and, thus, at which a search may be terminated. The latter are called exit nodes and may be either internal or leaf nodes. At internal nodes, all of the characters stored in the node must match exactly and entirely. If a search operation ends in a leaf node, the input word is not required to match entirely but must still match exactly. During the trie construction, one pass is made for each symbol to be inserted into the tree. One pass is also made during a search. The trie structure proposed by Dundas does not allow a deletion of an entry and can, thus, not be used to build and maintain a dynamically growing and shrinking data structure.

Therefore, it is an object of the invention to provide a method to build and maintain a data structure with a small storage complexity and a small code size for search arguments having a variable length. The keys should be allowed to be prefixes of each other with a possibility to rapidly identify the longest-matching-prefix without depending on storage intensive recursive procedures or operations. Nodes with one-way branching are to be avoided. It is a particular object to develop such a data structure enabling the insertion and deletion of keys at random.

SUMMARY OF THE INVENTION

The features believed to be characteristic of the invention are said forth in current claim 1. The following refers to important aspects of the inventions. One important aspect of the invention is to provide a trie-like database structure, in which each node contains a link or parent pointer to its immediate predecessor. The immediate predecessor is a node at the next higher level of hierarchy or, in terms of the tree structure, the next node closer to the root. With a parent pointer at every node of the trie structure, a search process can be divided into two parts performed sequentially. It will become apparent from the following that this two-step search has significant advantages over the known methods.

In the first part the search process, a keyword or search argument is applied as input to the data structure. Segments of this search argument are then used to guide the path through the trie.

These segments are bits or groups of bits, wherein a group of bit may represent a character or a whole word. The specific representation of a character or a word by bits or by a group of bits is depending on the applied coding scheme. Restricting the segment to a single bit simplifies the hardware of the search engine at the cost of having at most a two-way branching at a node. However, the described method can be extended to byte comparison or to comparison based on other non-binary alphabets or coding schemes.

The nodes can contain data or keywords representing the information to be retrieved. To avoid confusing the keyword which is applied as search argument and those keywords stored in the database, the latter are named "entries" whenever appropriate. An important feature of the invention is that no comparison is made between the complete search argument and entries stored in those nodes passed during this first part of the search. A search engine which controls the search process only takes into account those segments of the search argument which are used to identify the next leg of the search path through the tree, i.e. the next node of a lower hierarchy or the next node towards one leaf of the tree. In the compact trie structure of this invention, each node which is not a leaf node contains either at least an entry and a pointer leading to a child or pointers to at least two child nodes. Instead of establishing the search path directly as is the case in the class of the above-mentioned binary tree structures, the different segments of the search argument are identifying one of the child pointers of the current node. This child pointer provides the address to a subsequent node to the search engine.

The first part of the search process is terminated when either a leaf node of the tree is reached or the segments of the search argument are consumed. The second part of the search concerns the finding of a longest match. It is only at this part that a full comparison between the search argument and entries eventually stored in the nodes are made. The characteristic feature of this second part of the search is to backtrack the search path from the node at which it was terminated back to—if necessary—the root node at which the search entered the trie structure. It can easily been seen that to eschew comparisons while descending the tree accelerates the search process in total, provided a longest match exists with a high degree of probability within a short distance from the node at which the first part of the search terminates. In this case, the second (ascending) part of the search is terminated after a few nodes and many unnecessary and time consuming comparator operations are avoided.

At first, the entry stored at the node at which the first part of the search terminates is compared to the complete search argument. If it matches, the search is successfully terminated, else the link information to the immediate predecessor, i.e. the parent pointer, as mentioned above, is used by the search engine to determine the next node at which the second full-fledged comparison is made. This process is repeated until a match is encountered, the search argument has no match, the search terminates at the root node. It should be noted that the invention does not only allow to recognize a perfect match, i.e. an identity between the search argument or key and an entry stored in the data structure. It can equally be applied to establish prefix matching, i.e. a partial agreement between the two. In this case, a successful match is signalled when an stored entry is consumed before any discrepancy between it and the search argument is detected. The invention can also be applied to establish all matching prefixes of a keyword or search argument, in which case the second (backtracking) part of the search is regularly terminated at the root node.

By either storing and applying entries or keywords in a reversed order or by starting the search process by the last segment of the search argument and equally beginning comparisons by the last segment of a stored entry, the invention is adaptable to postfix matching as well.

As another feature of the invention, preferably each node comprises an index which identifies a specific segment of the keyword or search argument. This segment is used to determine the next leg of the search path. In many tree-like databases, every segment or bit of the search argument is used to control the path through the tree. With the index number, the search argument is probed only at the next relevant segment, leaving out all intermediate segments. In the context of the present invention, a relevant segment is characterized by distinguishing the next following entries stored in the tree, i.e. the index of a node denotes the segment at which immediately following entries differ.

As mentioned above, the segment identified by the index is used to select one of the possible child pointers stored in the node. Effectively, the index can also be used to keep the data structure in a compact form. As described above, a compact trie is characterized by avoiding nodes the presence of which in the database has no impact on the search result. A typical example for such a superfluous node is a node with one-way branching, i.e. a node which simply contains a pointer to a node of the following hierarchy.

A further aspect of the invention includes a maintenance engine to insert new entries in the memory unit in which the database is stored and to delete old entries from it. Both, the insertion and deletion operation is designed to ensure that the structure of the trie remains compact. Preferably, the insertion method comprises a possibility to store a new node as root node to all other nodes of the data base. The deletion method comprises the steps of determining whether the node from which an entry is deleted can be eliminated entirely, and, if this is the case, whether the predecessor or parent node of this deleted node is still required. These checks prevent the existence of unnecessary nodes, e.g. nodes with one-way branching, provide an efficient use of the installed storage memory and further accelerate the search process. The trie structure remains in its most compact form. The insertion and deletion of nodes or entries may affect the content of the index field.

The maintenance engine determines the path through the trie to the node at which an entry is to be inserted or deleted by using essentially the first part of the search process as described above. Thus, the path through the trie is guided by said entry itself. However, the second part of the search process to establish the longest match is shunned and an insertion node is identified preferably by reentering the trie again at the root node and descending to the first node at which a maximum matching occurs. It is the primary task of the first path through the trie to establish the maximum length of the matching data sequence.

Another aspect of the invention is an apparatus and a method for storing, maintaining, and operating a trie-like database for communication and computer network applications. In particular, the invention can be applied to route information from one unit within the network to another. It is useable when implementing reachablity tables in gateways to retrieve the optimal way a incoming message should be passed on, or as explained above, to enables a fast identification of validation of existing addresses in a given network. For this purpose, the database is part of a switching unit or router in the network. It comprises means for extracting the address information from any information passing the router. Operation of the apparatus results in establishing an exact match or in the longest prefix existing in that part of the network which is served by the router.

The invention can also be used in a protocol adapter to translate between coding schemes and functions of different network protocols. In other applications, such as identifying the access rights of a user to distributed resources, all valid prefixes may required with each prefix level corresponding to a respective level of security.

The invention itself, as well a preferred mode of use, and further objects and advantageous thereof, will best be understood by reference to the following detailed description of an illustrative embodiment when read in conjunction with the accompanying drawings.

DESCRIPTION OF THE DRAWINGS

The invention is described in detail below with reference to the following drawings.

MODE(S) FOR CARRYING OUT THE INVENTION

In the following, the use of this invention is demonstrated within the environment of a switch which directs incoming data packets into outgoing channels depending on the header information of a data packet and a longest prefix matching process comparing those header information with the valid addresses which are stored in the switch. This environment exhibits just one feasible way of exploiting the invention. Similar applications might be extended into the field of circuit switching or elsewhere.

Figure 1:
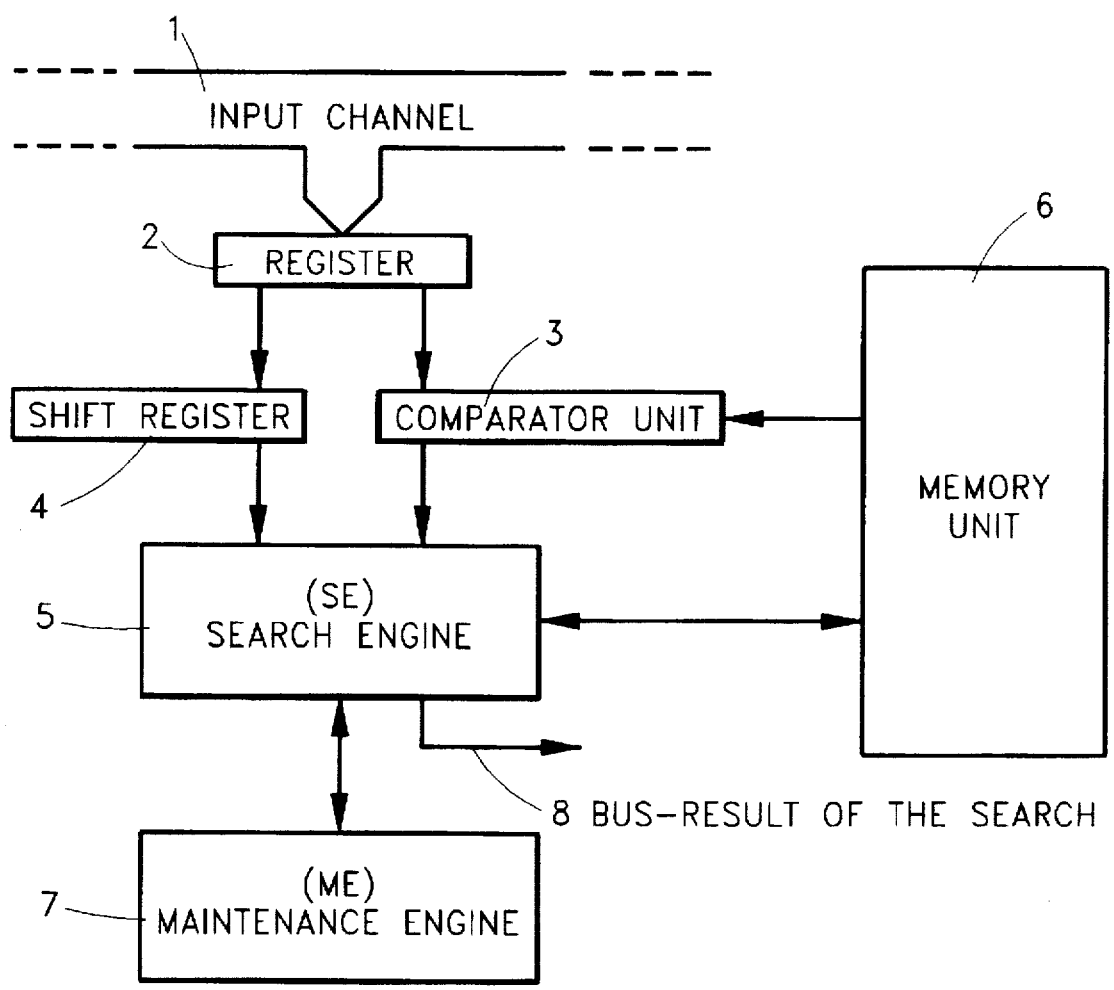
FIG. 1 is a block diagram of a data switch with means for a fast prefix matching to route incoming data packets to other units in a communication network.

Referring now to FIG. 1, a relevant header information is extracted from a data packet transferred over an input channel 1 of a packet switch. The header information is made available by storing it in a register 2, which itself is connected to a comparator unit 3 and a shift register 4. The shift register is triggered by a SEARCH ENGINE (SE) 5. The shift register acts as fetch unit to determine the value of a segment of the search argument and may be replaced by a bit-addressable register or any other equivalent means. Besides controlling the shift register, the SE further receives the output or result of the comparator unit 3 and addresses a memory unit 6, which contains valid addresses for the switch. The memory unit may be built by using random access memories (RAMs) or equivalent read/write storage devices (DRAMs, EEPROMs, etc.), or any combination thereof. The result of the search is available at bus 8.

In cooperation with a MAINTENANCE ENGINE (ME) 7, the SE keeps the entries of the memory unit 6 in a trie-like structure as required by the invention. It should be noted that the term "engine" is commonly used in the art to describe a device which may either be software executing on a host or a dedicated microprocessor or custom built hardware. For high speed switching technology, however, an implementation in terms of a finite state machine in hardware may be feasible.

Figure 2:
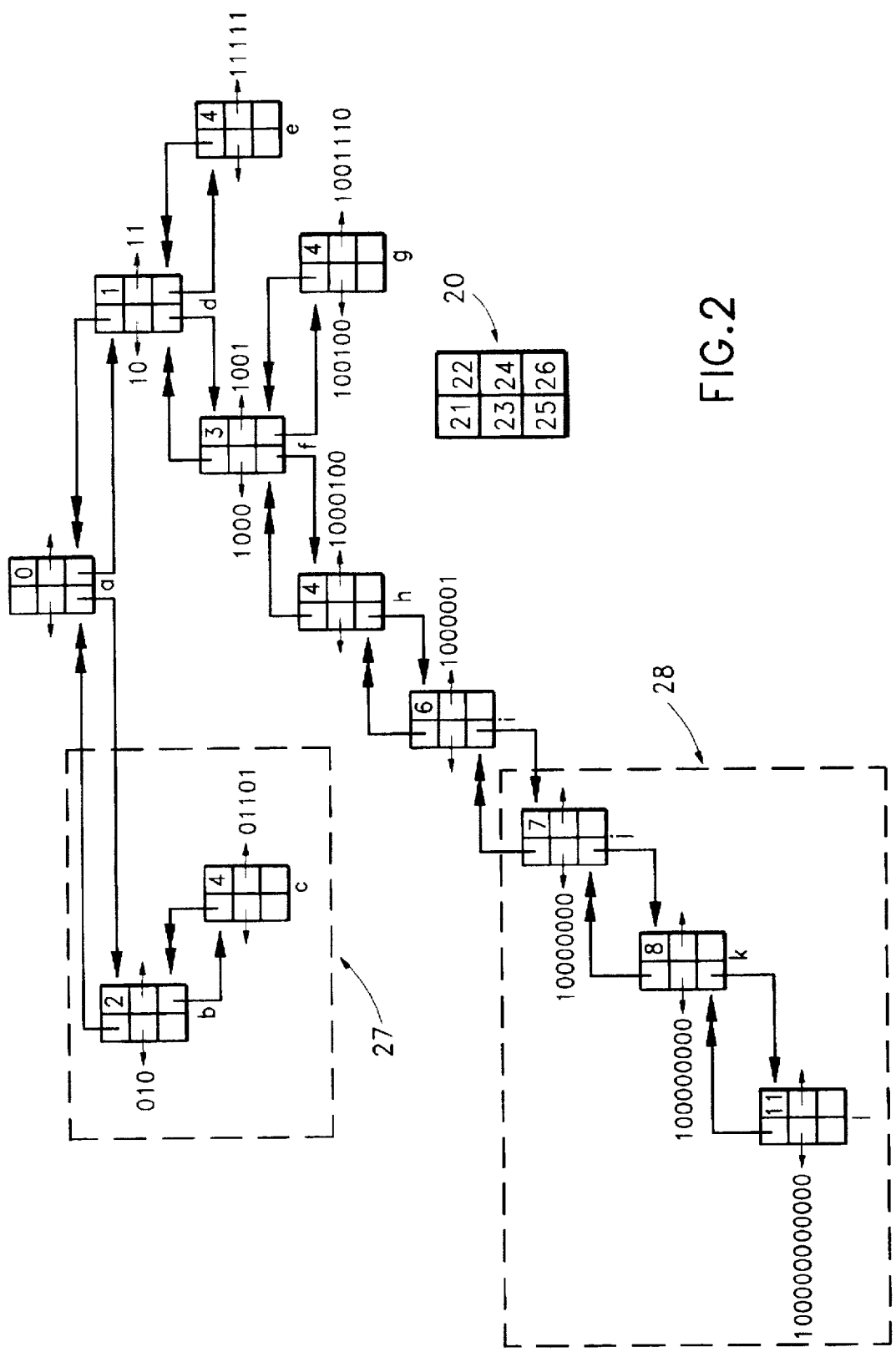
FIG. 2 shows an example of a trie-structured database for fast prefix matching.

In FIG. 2, a trie-like structure in which entries are stored in a memory unit like the one of FIG. 1, is illustrated. It is important to note that the structure of FIG. 2 gives no indication about the actual addresses at which the entries are stored in a, for example, RAM unit. No necessity exists to store all entries to a node, i.e. key words, pointers, index numbers, etc., at neighboring addresses. In fact, the entries may be stored in different RAMs. Therefore, FIG. 2 should be treated as representing an organizational or logical structure. It is further simplified by a reduction in the number of entries, which is usually of the order of tens of thousands.

In the figure, an examplatory node 20 is presented in an isolated and enlarged manner. It comprises six fields which appear in the actual memory unit as six storage location. Entries to the node or pointers to those entries are stored in fields 23 and 24. Entries of a node may have different lengths, only if the node is a leaf node. The fields 25 and 26 store (child) pointers to the "left" subtree and to the "right" subtree, respectively, i.e. to the storage location of nodes which succeed the current node within the trie-like structure.

The whole database structure implies the convention that a binary "0" points to the left and a "1" points to the right. This convention facilitates design and operation of the device. The node of the current example comprises two more fields 21, 22. In contrast to the fields 23–26, these two fields always contain in most cases an entry. The root node makes an obvious exception. The first of this two fields 21, 22 stores the parent pointer, giving the storage location of the parent node of the current node. The second field contains an index information. This index information 22 indicates the bit position of the first bit at which two entries stored in this or following nodes differ (the distinguishing bit) or simply indicates the length of a stored entry. For the purpose of convenience, "0" in the index field denotes the first bit of a keyword or entry. The index points to a single bit, the distinguishing bit of a search argument, thus allowing only a binary decision about the direction in which the search has to branch, i.e. either right or left. It is possible to use the index to point to several bits of the search argument. In this case, a corresponding manifold of branching possibilities exists.

For further illustration, FIG. 2 shows an example of a subtrie 27 of the root node including an example of a prefix branch 28, where all entries are prefixes of each other. With regard to the following figures, the nodes are identified by single letters.

The steps the SE performs in operation are described below in a condensed manner. The same steps are then repeated using a language close to the programming language C, which is a well known language for system programming and other applications. Using this description, a skilled person is enabled to design and program a device according to the present invention.

Before describing the actual operations, first some important definitions are given. As a general convention, operators are prefixed with an o, variables used in pseudo code with a v, and constants with a c. Keys, i.e., either the search argument or the stored entries are defined as non-empty sequences of binary digits with arbitrary but finite length. Bit positions in keys are counted from left to right starting from zero, which denotes the most significant bit. Keys are used as arguments of the following operators:

oWidth(Key) Largest bit position of a key.

oLength(Key) Number of bits of a key. Note that oLength(Key) ≡ oWidth(Key)+1.

oIndexBit(Key, Pos) Value of the bit of Key at position Pos, for $0 \leq Pos \leq$ oWidth(Key).

oComp(Key, KeyTwo) First bit position where the two keys differ, or oWidth(Key)+1, if Key is a prefix of KeyTwo. Note that Key and KeyTwo are equal iff (only if) oComp(Key,KeyTwo)>max(oWidth(Key),oWidth(KeyTwo)), which is equivalent to oComp(Key,KeyTwo)=max(oWidth(Key),oWidth(KeyTwo))+1.

A key K is said to be a prefix of another key K', if oWidth(K)$\leq$oWidth(K'), and oIndexBit(K,i)= oIndexBit(K',i) for $0 \leq i \leq$ oWidth(K). That is, K matches K' in all its bit positions. As a corollary to this definition, one may conclude that two keys are equal, iff they are prefixes of each other.

Nodes are defined as composite data structures, which store keys and whose interrelation forms the semantics of the database of all stored keys (entries). Nodes have the following structure in a "C-like" representation. The orientation or semantics prefixes left, and right is defined such that to the "right" of a given node n with Index(n) only keys are stored which have a binary "1" in position Index(n), and to the "left" only those with a "0" in position Index(n), including the keys stored in the respective subtries. The orientation is encoded for the "C-like" code as cLeft, denoting "0," and cRight denoting "1." A graphic representation of a node as used in this example is shown in FIG. 2.

Nodes appear as arguments of the following additional operations:

oKey(Node, Bit) Denotes the value of LeftKey of node Node, if Bit denotes cLeft, i.e., 0, and the value of RightKey of node Node otherwise.

oSubTrie(Node, Bit) Denotes the link to the left subtrie at node Node, i.e., the value of LeftSubtrie, if Bit denotes cLeft, and the value of RightSubTrie of node Node otherwise.

oKeys(Node) Denotes the set of keys stored in Node and in its subtries.

oPrefix(Node) Denotes the uniquely identified common prefix shared by all keys in oKeys(Node)

The following definitions will be used for particular properties of nodes:

Distinguishing Index The index of a node n is said to be distinguishing, if there exist keys in okeys(n) with different bit values in position Index(n).

Leaf node A node with no subtries. I.e., LeftSubTrie(n) is NULL, and RightSubTrie(n) also.

Single key leaf node A leaf node with only one stored key.

Chain node A node without keys and exactly one non-empty subtrie.

Using these definitions, the following sections describe in detail the methods used for key insertion, deletion and the matching procedure which identifies longest matching prefixes.

Match Operation

Step 1. If the trie is empty, return failure.
Now locate the node below which there is no prefix:
Step 2. Make the root of trie the current node.
Step 3. Get the search argument. Get index. If the search argument does not have the distinguishing bit as identified by index, return failure.
Step 4. If the distinguishing bit of the search argument is zero (one) and there is no left (right) subtrie, go to Step 7.
Step 5. If the distinguishing bit of the search argument is zero (one) and there is a left (right) subtrie, make the root of this subtrie the current node.
Step 6. If the search argument has the distinguishing bit, go to Step 4.

Now start the second part of the search, i.e. walk upward and check whether a prefix exists.

Step 7. If the distinguishing bit of the search argument is zero (one) and the left (right) entry is a prefix of the search argument, return the entry.
Step 8. If the current node is the root of the trie, return failure.
Step 9. Make the parent of the node the current node. Go to Step 7.

The same steps described in "C-like" representation:
The key to be matched with those stored in the trie to determine the longest matching prefix is denoted by MatchKey.

| Case(s) | Common |
|---|---|
| Code | |

(Return if the trie is empty)
If the trie is empty Terminate with negative result;
STEP1:
(Locate the node below which there is no prefix.)
Set n to the root node of the trie;
vWidth = oWidth(MatchKey);
If (vWidth < Index(n)) Terminate operation with negative result;
While not terminated repeat the following:
    vSubTrie = oSubTrie(n, oIndexBit(MatchKey, Index(n));
    If((vSubTrie != NULL) And
        (vWidth >= Index(root node of vSubTrie))
        Set n to the root node of vSubTrie
    Else Terminate STEP1;
STEP2:
(Now walk upward and check whether a prefix exists.)
While not terminated repeat the following:
    If ( oKey(n, oIndexBit(MatchKey, Index(n))
        is not a prefix of MatchKey))
    n = Parent(n)
Else Terminate STEP2;
If (n == NULL) Terminate with negative result;

The operation of STEP1 requires very little processing, as only pointers need to be moved and single bits of keys need to be tested. On the upward path, STEP2 tests for the prefix predicate, the verification of which may be optimized for the local environment, such as taking advantage of processor word-sizes and instruction sets.

The matching operation is optimized for positive result, since in a routing environment, negative results resemble error situations which cause data packets to be discarded and control messages to be transmitted with low priority. Recovery of such errors is generally not deemed to be overly time-critical.

In the following, the operation steps of the MAINTENANCE ENGINE (ME) are described using FIGS. 3A–3G and 4A, B. Again, a representation of the operations steps of the ME close to the programming language C is appended. The entry to be stored is defined as "new" entry or key, an existing one is defined as "old" entry(key).

Insert Operation

Step 1. If the trie is empty, add the new entry to the new node with (length of the entry - 1) as the (maximum) index. Return.
Step 2. Locate the node around which to insert the entry:
1. Locate a leaf node guiding the descent by the new entry, i.e. follow the normal search path as far as possible.
2. Calculate the number of matching leading bits of the new entry with those in the located leaf node.
3. Starting from the root, descent the trie only to the node past which no longer match is possible. This is then the insertion node.

When for example, the entry 100011 is to be stored into the tree of FIG. 2, the Step 2.1 leads to leaf node I. The calculation step leads to a maximum match of 4 bits. Therefore, a longer match can not be achieved when going beyond node f. This is the insertion node.

The following three steps describe alternatives depending on the situation at the insertion node.

Step 3. The new entry needs to be inserted in or below the insertion node and the respective subtrie is empty.
1. The respective side is empty: just add the new entry.

Figure 3A:
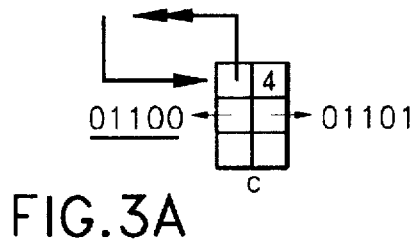
FIGS. 3A–3G illustrate some entry insertion operations as performed by a maintenance engine.

This simple case is demonstrated in FIG. 3A, in which the newly inserted entry 01100 is stored at the left entry field of node c. The new entry is underlined. (Node c is taken from FIG. 2.)
2. The stored entry is equal to the new one: just overwrite.
3. The stored entry fits exactly: add the new entry in a node below.

Figure 3B:
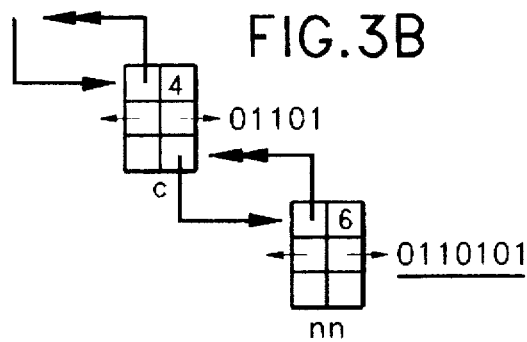

Referring to FIG. 3B, the new node nn stores the new entry 0110101 which again is marked by being underlined.
4. The new entry fits exactly: move the old entry into a new node below.

Figure 3C:
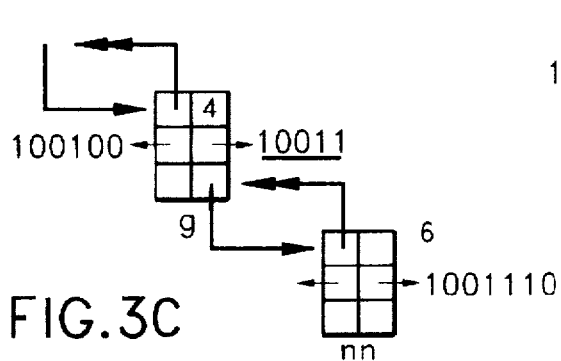
Figure 3D:
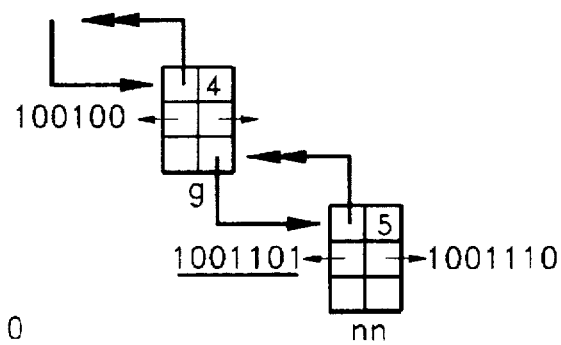
Figure 3E:
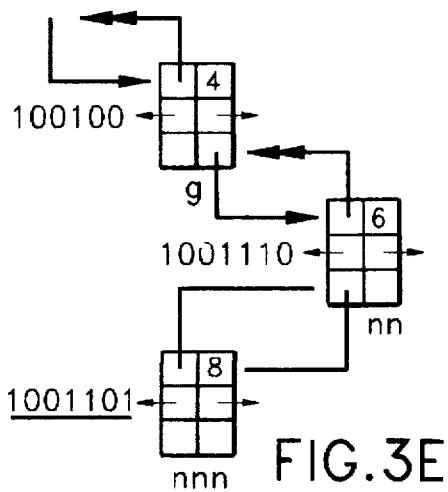

This case is shown in FIG. 3C, using the same labeling conventions as before, i.e. using "nn" or "nnn" for newly inserted nodes. (The node g is also taken from the tree of FIG. 2.)
5. If both entries are longer than the node index, apply one of the following three cases:

If the entries are not prefixes of each other: add in one new node below the index node (as shown in FIG. 3D).

Figure 3F:
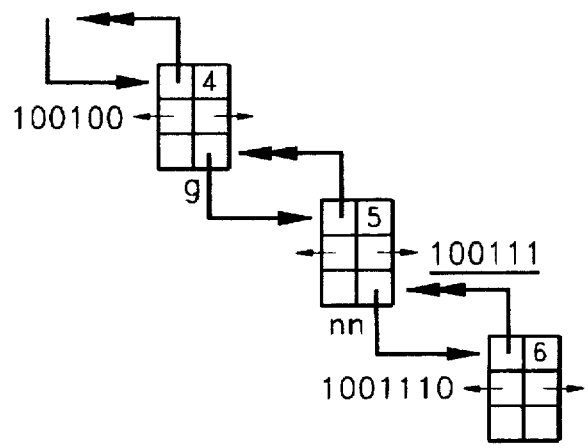

If the old entry is a strict prefix of the new one: move the old entry down one node and the new one even one node further (shown in FIG. 3E) If the new entry is a strict prefix of the old one: move the new entry down one node and the old one even one node further down (see FIG. 3F).

Figure 3G:
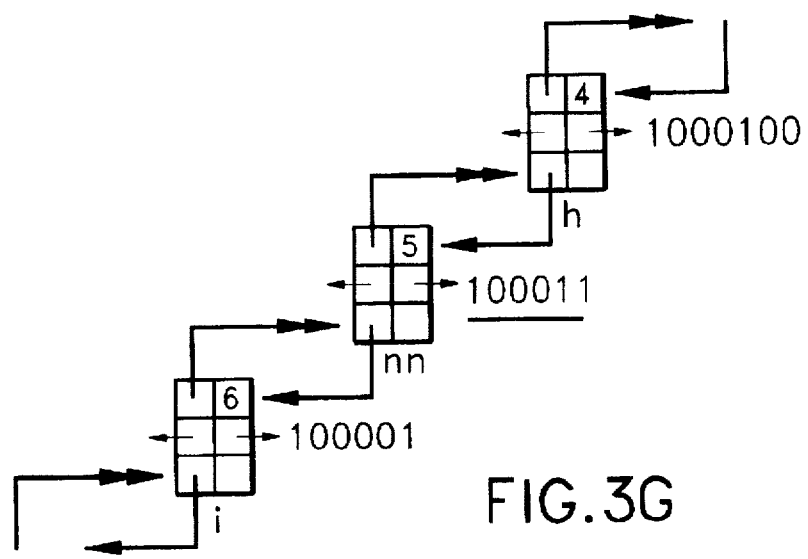

Step 4. The new entry needs to be inserted in or below the insertion node and the respective subtrie is not empty.
1. The new entry fits exactly: overwrite the old one if any.
2. A new node needs to be added: Then, either the new entry is not a prefix of the entries in the subtrie, in which case, if said subtrie is a leaf node containing a single entry, the old and new node are merged and the index is set to the number of the distinguishing bit minus one and the now empty subtrie is erased from the database, or elsewise, i.e. if said subtrie is not a leaf node with a single entry, this subtrie is linked to the new node. This case is illustrated by FIG. 3G. If the new entry is a prefix of the subtrie, this subtrie is linked to the new node.

Step 5. The new entry needs to be inserted in or above the insertion node, which is the current root node of the trie. Two main cases are to be distinguished:
1. The trie is a single node trie and the root node has no entry at the insert position: add the new entry to the empty entry field and adjust the index.

2. A new node needs to be added above the root: If the new entry is not a prefix of the entries in the trie, the new node is added as the new root node. If the entry is a prefix of an entry stored in the root node, the new node is added as a new root node.

The ME is also performing the operation steps necessary to delete entries from the trie-like database and reestablishing its compact form.

The steps for key insertion is presented as a set of distinct cases, each of which describes the operations required to properly insert a new key such that the database properties as described above are preserved. The new key to be inserted is denoted by NewKey.

1. Insertion of Keys. First Level (Empty and Non-empty Trie)

| Case(s) | Empty Trie |
|---|---|
| Code | If (Trie is empty) | nn=AllocateNode( );

Index(nn)=oWidth(NewKey);

oKey(nn, oIndexBit(NewKey, Index(nn)))=NewKey;

| Case(s) | BeST, BvST, A |
|---|---|
| Code | Else |

(The Trie is not empty. Locate the node around which to insert the new key in three steps.)
STEP1:
(Locate a leaf node guiding the descent by the new key.
I.e., follow the normal search path as far as possible.)
Set n to the root node of the trie;
While not terminated repeat the following:
  If    (oWidth(NewKey) >= Index(n))    vBit = oIndexBit(NewKey,Index(n))
  Else    vBit = cLeft;
  If    ((vBit == cLeft And LeftSubTrie(n) != NULL) Or
      (RightSubTrie(n) == NULL))    vSubTrie = LeftSubTrie(n)
  Else    vSubTrie = RightSubTrie(n);
If (vSubTrie != NULL) Set n to the root node of vSubTrie
Else    Terminate STEP1;
STEP2:
(Calculate the number of matching leading bits of the new key with those in the located leaf node, denoted by n.)
  If    (oWidth(NewKey) >= Index(n))    vBit = oIndexBit(NewKey,Index(n))
  Else    vBit = cLeft;
  If    ((vBit==cLeft And LeftKey(n) != NULL) Or
      (RightKey(n) == NULL))    vKey = LeftKey(n)
  Else    vKey = RightKey(n);
vMaxMatch = oComp(NewKey, vKey);
STEP3:
(Repeat STEP1 but only to the node past which no longer match is possible. This is then the insertion node.)
Set n to the root node of the trie;
vWidth = min(oWidth(NewKey), vMaxMatch);
If (vWidth < Index(n)) Terminate STEP3;
While not terminated repeat the following:
    vSubTrie = oSubTrie(n, oIndexBit(NewKey, Index(n)));
    If((vSubTrie != NULL) And
    (vWidth >= Index(root node of vSubTrie))
    Set n to the root node of vSubTrie
Else terminate STEP3;

Insertion is now accomplished by selection of the correct subcase BeST1, . . . ,5.3, BvST1, . . . 2.2, A1, . . . .2.2.

2. Insertion of Keys. Second Level for cases BeST, BvST, and A

Cases for non-empty tries. The node identified in STEPs 1 to 3 is denoted by nins.

| Case(s) | BeST1, . . ., BeST5 |
|---|---|
| Code | If ((min(vMaxMatch, oWidth(NewKey)) >= Index(nins)) And (oSubTrie(nins, oIndexBit(NewKey, Index(nins))) == NULL )) |

(See the level 3 for the further processing)

| Case(s) | BvST1, BvST2 |
|---|---|
| Code | Else If ((min(vMaxMatch, oWidth(NewKey)) >= Index(nins)) And (oSubTrie(nins, oIndexBit(NewKey, Index(nins))) != NULL )) |

(See the level 3 for the further processing)

| Case(s) | A1, A2 |
|---|---|
| Code | Else |

(min(vMaxMatch, oWidth(NewKey))<Index(nIns); See the level 3 for the further processing)

3. Insertion of Keys. Third level for cases BeST1, . . . , BeST5

Cases for non-empty tries with insertion in or below nins, the pertinent subtrie being empty. The node identified in STEPs 1 to 3 is denoted by nins.

| Case(s) | BeST1 |
|---|---|
| Code | If ( oKey(nIns, oIndexBit(NewKey, Index(nIns)) == NULL) |

(The respective side is all empty. Just add the new key.)
   oKey(nIns, oIndexBit(NewKey, Index(nIns))=NewKey;

| Case(s) | BeST2 |
|---|---|
| Code | Else If (oKey(nIns, oIndexBit(NewKey, Index(nIns)) == NewKey) |

(The stored key is equal to the new one. Just overwrite.)
   oKey(nIns, oIndexBit(NewKey, Index(nIns))=NewKey;

| Case(s) | BeST3 |
|---|---|
| Code | Else If (oWidth(oKey(nIns, oIndexBit(NewKey, Index(nIns)))) == Index(nIns)) |

(The stored key fits exactly. Add the new key in a node below.)
   nn=AllocateNode( );
   Index(nn)=oWidth(NewKey);
   oKey(nn, oIndexBit(NewKey, Index(nn))=NewKey;
   Parent(nn)=nIns;
   oSubTrie(nIns, oIndexBit(NewKey, Index(nIns))=nn;

| Case(s) | BeST4 |
|---|---|
| Code | Else If (oWidth(NewKey) ==Index(nIns)) |

(The new key fits exactly. Move the old key into a new node.)
   vKey=oKey(nIns, oIndexBit(NewKey, Index(nIns));
   nn=AllocateNode( );
   Index(nn)=oWidth(vKey);
   oKey(nn, oIndexBit(vKey, Index(nn))=vKey;
   oKey(nIns, oIndexBit(NewKey, Index(nIns))=NewKey;
   Parent(nn)=nIns;
   oSubTrie(nIns, oIndexBit(NewKey, Index(nIns))=nn;
(May also use vKey in the last operation)

| Case(s) | BeST5 |
|---|---|
| Code | Else |

(The stored key and the new key are both longer than the node index. Both keys need to be moved into new node(s) below nins.)

(Save the stored key into a temp variable and reset nins)
   vKey=oKey(nIns, oIndexBit(NewKey, Index(nins));
   oKey(nIns, oIndexBit(NewKey, Index(nIns))=NULL;
   (Key will be moved)
(Find out how far the stored and the new key match)
   vExactMatch=oComp(vKey, NewKey);
(See level 4 for the further processing.)

4. Insertion of Keys. Third level for cases BvST1 and BeST2
   Cases for non-empty tries with insertion in or below nins, the pertinent subtrie being non-empty. The node identified in STEPs 1 to 3 is denoted by nins.

| Case(s) | BvST1 |
|---|---|
| Code | If (oWidth(NewKey) == Index(nIns)) |

(The new key fits exactly. Overwrite the old one if any.)
   oKey(nIns, oIndexBit(NewKey, Index(nIns))=NewKey;
   .br

| Case(s) | BvST2 |
|---|---|
| Code | Else |

(Add the new key to a new node)
   nn=AllocateNode( );
   Index(nn)=min(vMaxMatch, oWidth(NewKey));
   oKey(nn, oIndexBit(NewKey, Index(nn))=NewKey;
(Save the link to the old subtrie of nins)
   vSubTrie=oSubTrie(nIns, oIndexBit(NewKey, Index(nIns));
(Add the new node below nins)
   Parent(nn)=nins;
   oSubTrie(nIns, oIndexBit(NewKey, Index(nIns))=nn;
(Add the subtrie of nins to nn guided by the prefix predicate.)

5. Insertion of Keys. Third level for cases A1 and A2
   Cases for non-empty tries with insertion in or above nins. The node identified in STEPs 1 to 3 is denoted by nins.

| Case(s) | A1 |
|---|---|
| Code | If ((nIns is a single key leaf node) And (oWidth(NewKey) >= vMaxMatch)) |

(The new key is not a prefix of the subtrie key(s).)
(Add the new key to the old node and adjust the index)
(Store the SINGLE key of nIns in a temp variable.)
   vKey=oKey(nIns, cLeft)+oKey(nIns, cRight);
(Adjust the index and add two keys)
   Index(nIns)=min(oWidth(NewKey), vMaxMatch);
   oKey(nIns, oIndexBit(vKey, Index(nIns))=vKey;
   oKey(nIns, oIndexBit(NewKey, Index(nIns))=NewKey;

| Case(s) | A2 |
|---|---|
| Code | Else |

(Add the new key to a new node above nIns acc. to prefix pred.)
   nn=AllocateNode( );
   Index(nn)=min(vMaxMatch, oWidth(NewKey));
   oKey(nn, oIndexBit(NewKey, Index(nn))=NewKey;

(Add the new node at the TOP of the trie.)
   Parent(nn)=NULL;
(Add the whole previous trie guided by the prefix predicate.)
6. Insertion of Keys. Fourth level for cases BeST5.1, . . . , BeST5.3

Cases for non-empty tries with insertion below nIns, the stored and the new key being of width greater than the node index. The node identified in STEPs 1 to 3 is denoted by nIns, and the old key which is being moved by vKey. BeST5.2 and BeST5.3 are the only cases where two nodes have to be added to include one key.

| Case(s) | BeST5.1 |
|---|---|
| Code | If (vExactMatch <= min(oWidth(vKey), oWidth(NewKey))) |

(The keys are not prefixes of each other. Add in one new node below nIns. Observe that the pertinent subtrie is empty.)
   nn=AllocateNode( );
   Index(nn)=vExactMatch;
   oKey(nn, oIndexBit(vKey, Index(nn))=vKey;
   oKey(nn, oIndexBit(NewKey, Index(nn))=NewKey;
   Parent(nn)=nIns;
   oSubTrie(nIns, oIndexBit(NewKey, Index(nins))=nn;

| Case(s) | BeST5.2 |
|---|---|
| Code | Else If (vExactMatch == oWidth(vKey) + 1) |

(The old key is a strict prefix of the new one. The old key is moved down one node, the new one even one node further.)
   nn=AllocateNode( );
   nnn=AllocateNode( );
   (Add the keys into the respective new nodes at niax index.)
   Index(nn)=oWidth(vKey);
   oKey(nn, oIndexBit(vKey, Index(nn))=vKey;
   oIndexBit(vKey, Index(nn))=vKey;
   Index(nnn)=oWidth(NewKey);
   oKey(nnn, oIndexBit(NewKey, Index(nnn))=NewKey;
(Add the nodes to the trie.)
   Parent(nn)=nins;
   oSubTrie(nIns, oIndexBit(vKey, Index(nIns)))=nn;
   Parent(nnn)=nn;
   oSubTrie(nn, oIndexBit(NewKey, Index(nn)))=nnn;

| Case(s) | BeST5.3 |
|---|---|
| Code | Else |

(The new key is a strict prefix of the old one. The new key is moved down one node, the old one even one node further.)
   nn=AllocateNode( );
   nnn=AllocateNode( );
(Add the keys into the respective new nodes at max index.)
   Index(nn)=oWidth(NewKey);
   oKey(nn, oIndexBit(NewKey, Index(nn))=NewKey;
   Index(nnn)=oWidth(vKey);
   oKey(nnn, oIndexBit(vKey, Index(nnn))=vKey;
(Add the nodes to the trie.)
   Parent(nn)=nIns;

oSubTrie(nIns, oIndexBit(vKey, Index(nIns)))=nn;
   Parent(nnn)=nn;
   oSubTrie(nn, oIndexBit(NewKey, Index(nn)))=nnn;

7. Insertion of Keys. Fourth level for cases BvST2.1 and BvST2.2

The node identified in STEPs 1 to 3 is denoted by nIns, the new node by nn, and the former subtrie of nIns by vSubTrie. The former subtrie of nIns needs to be attached to the new node at the correct side.

| Case(s) | BvST2.1 |
|---|---|
| Code | If (oWidth(NewKey) >= vMaxMatch) |

(The new key is no prefix of the keys in the subtrie.)
(Check whether one may delete the former subtrie.)
If (vSubTrie is a single key leaf node)
(Move the single key up into the new node and deallocate the empty subtrie node.)
   vKey=oKey(vSubTrie, cLeft)+oKey(vSubTrie, cRight);
   oKey(nn, oIndexBit(vKey, Index(nn))=vKey;
   DeAllocate(vSubTrie);
   Else
(Add the subtrie to the new node.)
   oSubTrie(nn,!oIndexBit(NewKey, Index(nn))=vSubTrie;
   Parent(vSubTrie)=nn;

| Case(s) | BvST2.2 |
|---|---|
| Code | Else |

(The new key is a prefix of the subtrie keys. Just add link.)
   oSubTrie(nn, oIndexBit(NewKey, Index(nn))=vSubTrie;
   Parent(vSubTrie)=nn;

8. Insertion of Keys. Fourth level for cases A2.1 and A2.2
   The node identified in STEPs 1 to 3 is denoted by nIns, the new node by nn. nIns needs to be attached to the new node at the correct side.

| Case(s) | A2.1 |
|---|---|
| Code | If (oWidth(NewKey) >= vMaxMatch) |

(The new key is no prefix of the keys in the trie. Just add.)
   oSubTrie(nn, !oIndexBit(NewKey, Index(nn))=nIns;
   Parent(nIns)=nn;

| Case(s) | A2.2 |
|---|---|
| Code | Else |

(The new key is a prefix of the trie keys. Just add link.)
   oSubTrie(nn, oIndexBit(NewKey, Index(nn))=nIns;
   Parent(nIns)=nn;

In the following, the steps to delete an entry or key from the database are described.

Delete Operation

Step 1. If the trie is empty, return failure.

Step 2. Guiding the descent by the entry to be deleted, locate a node with an index not exceeding the width of that entry.

Step 3. If the node does not contain the entry to be deleted, return failure.

17

Step 4. Remove the entry.

Step 5. If n is empty, remove node n, mark n's parent node as N, and go to step 10.

Step 6. If n is a chain node, link n's parent to its single subtrie, remove n from the database, mark the subtrie as N., and go to step 10.

Step 7. If n is a leaf node containing a single entry, then maximize the index (to the full length of the entry -1), mark n as N, and go to step 10.

Step 8. If the subtrie is a leaf node containing a single entry, then mark the subtrie as N and go to step 10.

Step 9. Return.

In previous steps, a node might be marked with "N." The following step removes this node if possible.

Step 10. If N is a leaf node containing a single entry and there is no entry at the respective side of N's parent, then store its entry in the parent node. Remove N.

Figure 4A:
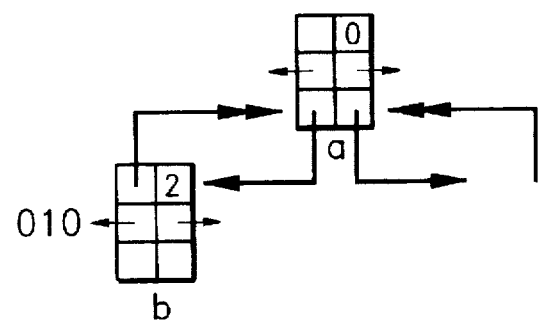
FIGS. 4A, B illustrate an entry deletion operation as performed by a maintenance engine.
Figure 4B:
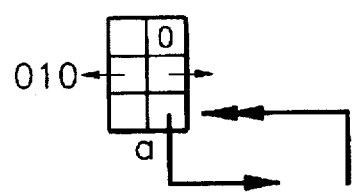

The operations of the ME are shown by FIGS. 4A,B. FIG. 4A shows nodes a and b of FIG. 2 after the deletion of entry 01101. At this point node b is marked as N. FIG. 4B shows the case after performing the garbage collection described by step 10, i.e., removing node b. In the subsequent description, the above-mentioned operations are described in a manner, which enables a skilled person to design the SE and the ME to perform the delete operations such that the compact form of the data structure remains intact. The key to be deleted is denoted by DelKey. vNode points to nodes that may be garbage collected, i.e., also deleted in the last step.

| Case(s) | Common |
|---|---|
| Code | |

(Return if the trie is empty.)

If the trie is empty Terminate with negative result;
(Locate the node with the key to be deleted if there is one.)

Set n to the root node of the trie;
vWidth=oWidth(DelKey);
If (vWidth<Index(n)) Terminate operation with negative result;
While not terminated repeat the following:
vSubTrie=oSubTrie(n, oIndexBit(DelKey, Index(n)));
If((vSubTrie!=NULL) And
(vWidth>=Index(root node of vSubTrie))
Set n to the root node of vSubTrie
Else Terminate;
(n might be the node with the looked-for key. Need to check!)
If ( oKey(n, oIndexBit(DelKey, Index(n)))==DelKey )
oKey(n, oIndexBit(DelKey, Index(n)))=NULL;
Else Terminate with negative result;
(Since a key has been deleted, garbage collect nodes if possible.)

| Case(s) | Empty Node |
|---|---|
| Code | If (n is empty) |

(No subtries and no keys -just delete an empty node and mark its parent for further garbage collection.)

18 vNode=Parent(n);
DeAllocateNode(n);

| Case(s) | Chain Node |
|---|---|
| Code | Else If (n is a chain node) |

(n has no more keys and just one subtrie.)
(Link n's parent node to its single subtrie.)
vParent=Parent(n);
vSubTrie=oSubTrie(n, cLeft)+oSubTrie(n, cRight);
If (vparent!=NULL)
    oSubTrie(vParent, oIndexBit(DelKey, Index(vParent))) =vSubTrie;
    Parent(vSubTrie)=vparent;
Else
    Parent(vSubTrie)=NULL; ( n was the root node)
(Free the node and mark vSubTrie for further garbage collection.)
vNode=vSubTrie;
DeAllocateNode(n);

| Case(s) | Single Key Leaf |
|---|---|
| Code | Else If (n is a single-key leaf-node) |

(n has one key left and no subtries - maximize the index.)
vKey=oKey(n, cLeft)+oKey(n, cright);
index(n)=oWidth(vKey);
oKey(n, oIndexBit(vKey, Index(n))=vKey;
oKey(n, !oIndexBit(vKey, Index(n))=NULL;
(Mark the node for further garbage collection.)
vNode=n;

| Case(s) | Single-Key Leaf-Node SubTrie |
|---|---|
| Code | Else If ((oSubTrie(n, oIndexBit(DelKey, Index(n))) is a single-key leaf-node |

(The respective subtrie is a single-key leaf node - mark for potential garbage collection.)
vNode=oSubTrie(n, oIndexBit(DelKey, Index(n)));

| Case(s) | No Garbage |
|---|---|
| Code | Else |

(No further garbage collection is possible.)

| Case(s) | Common |
|---|---|
| Code | |

(Common backend processing on vNode.)
(If vNode is a single-key leaf-node, then try to move its key up into the parent node)
If ( vNode has been set) And (vNode is a single-key leaf-node))
    vParent=Parent(vNode);
    vKey=oKey(vNode, cLeft)+oKey(vNode, cRight);(Get single key.)
(Is the key at the respective side in the parent empty?)
If ((vparent!=NULL) And (oKey(vParent, oIndexBit(vKey, Index(vParent))==NULL))
oKey(vParent, oindexBit(vKey, Index(vParent))=vKey;
oSubTrie(vParent, oIndexBit(vKey, Index(vParent))= NULL;
DeAllocateNode(vNode);

We claim:

1. Method for retrieving a prefix match, a postfix match or a complete match, preferably the longest prefix- or postfix match, or all prefix- or postfix matches of a search argument (input key) from entries stored in a database with a trie-like structure having nodes (20), with each node containing first link information (21) leading to at least one previous node (parent pointer) and second link information (25,26) leading to at least one following node (child pointer), at least one stored key (entry,23,24), or a combination, thereof, said method comprising the steps of entering at a node of said database (root node);

determining a search path from one node to another through said trie-like database by successively processing segments of said search argument which comprise only those parts of the entries which are necessary to identify the next (child) node, and said second link information (25,26) until said segments are consumed or a (leaf) node lacking said second link information (25,26) is reached;

comparing with said search argument an entry stored in the node at which said search path ended; and if no at least partial match between the search argument and said entry is found in said current node, backtracking said search path by processing said first link information (21) of said current node; and repeating the previous two steps until said at least partial match is found or said root node is reached.

2. Method in accordance with claim 1, wherein each node further contains an index (22) and while determining the search path only the segment of the search argument which is identified by the index is processed at any one of the nodes.

3. Method in accordance with claim 1 or 2, wherein a segment of a search argument contains one or more bits.

4. Method in accordance with claim 1, wherein the step of determining the search path is essentially characterized by a one-bit comparison.

5. Method in accordance with one of claim 1, wherein the search argument represents a unit address in a communication network.

6. Method in accordance with one of claim 1, wherein the search argument represents syntax from one network protocol to be translated into syntax of another network protocol.

7. Method in accordance with one of claim 1, wherein a new entry is inserted by steps comprising:

using said new entry as search argument, terminating the search when a (leaf) node lacking said second link information is reached, determining a maximum number of matching bits between an entry at the (leaf) node at which the previous step ended, again entering the database, and interrupting the path at a node beyond which no longer match is possible by comparing said maximum number with an index stored at each node of the data base, identifying said node as insertion node, comparing said new entry with an entry stored in the insertion node, and storing said new entry in said insertion node or in a newly created node located in said trie-like structure immediately before or after the insertion node depending on the result of the previous comparing step.

8. Method in accordance with one of claim 1, wherein a stored entry is deleted from the database by steps comprising:

the use of said stored entry as search argument, deleting the stored entry, and deleting the remaining node if a remaining stored entry or remaining second link information can be transferred to a previous (parent) node and deleting said previous node if the entry stored in it can be transferred to a further previous node.

9. Database with a trie-like structure for storing entries and retrieving a prefix match, a postfix match or a complete match, preferably the longest prefix- or postfix match, or all prefix- or postfix matches of a search argument (input key) from said entries, said database having nodes (20) which contain first link information (21) leading to at least one previous node (parent pointer), second link information (25,26) leading to at least one following node (child pointer), two stored keys (entries,23,24), and an index (22) identifying a segment at which the two stored entries differ, said second link information (25,26) being processable for determining a search path from one node to another through said trie-like database by successively processing said segments and said entries being comparable with said search argument and if no prefix-, postfix- or complete match between said search argument and said entry is found in said node, said first link information (21) being processable for backtracking said search path.

10. Apparatus for storing entries and retrieving a prefix match, a postfix match or a complete match, preferably the longest prefix- or postfix match, or all prefix- or postfix matches of a search argument (input key) from said entries, said apparatus comprising at least one memory unit (6) for storing said entries in nodes (20) of a trie-like structure, some of said nodes containing first link information (21) leading to at least one previous node (parent pointer) and second link information (25,26) leading to at least one following node (child pointer) and a stored key (entry,23,24) and an index, register means (2) for intermediately storing said search argument, a fetch unit (4) using said index for identifying and providing a segment of said search argument, a comparator unit (3) for comparing said segment of said search argument with the corresponding part of an entry stored in a node, and a search engine (5) for addressing and/or receiving entries stored in said memory, for determining a search path through said nodes depending on the output of said fetch unit (4), and for backtracking said search path depending on the output of said comparator unit (3) by comparing with said search argument an entry stored in the node at which said search path ends and if no prefix-, postfix-, or complete match between said search argument and said entry is found in said node, processing said first link information (21) of said node and repeating the previous two steps until said at least partial match is found or a root node is reached.

11. The apparatus in accordance with claim 10, further comprising a maintenance engine (7) for adding a stored entry and restoring the tree-like structure by using said new entry as search argument, terminating the search when a (leaf) node lacking said second link information is reached, determining a maximum number of matching bits between an entry at the leaf node at which the previous step ended, again entering the database, and interrupting the path at a node beyond which no longer match is possible by comparing said maximum number with an index stored at each node of the data base, identifying said node as insertion node, comparing said new entry with an entry stored in the insertion node, and storing said new entry in said insertion node or in a newly created node located in said trie-like structure immediately before or after the insertion node depending on the result of the previous comparing step and for deleting a stored entry and restoring the tree-like structure by using said stored entry as search argument, deleting the stored entry, and deleting the remaining node if a remaining stored entry or remaining second link information can be transferred to a previous (parent) node and deleting said previous node if the entry stored in it can be transferred to a further previous node.

12. A network switching apparatus comprising an apparatus in accordance with claim 10.

13. A network protocol converter comprising an apparatus in accordance with claim 10.

* * * * *